(12) United States Patent
Malik

(10) Patent No.: US 7,930,357 B2
(45) Date of Patent: *Apr. 19, 2011

(54) DATA COMPRESSION IN ELECTRONIC COMMUNICATIONS

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/258,781

(22) Filed: Oct. 27, 2008

(65) Prior Publication Data

US 2009/0049150 A1 Feb. 19, 2009

Related U.S. Application Data

(63) Continuation of application No. 10/959,632, filed on Oct. 6, 2004, now Pat. No. 7,444,381, which is a continuation-in-part of application No. 09/563,928, filed on May 4, 2000, now Pat. No. 7,089,286.

(51) Int. Cl.
G06F 15/16 (2006.01)
(52) U.S. Cl. ........ 709/206; 709/217; 709/238; 709/246; 709/247; 715/752
(58) Field of Classification Search .......... 709/206, 709/217, 238, 246, 247; 715/752
See application file for complete search history.

(56) References Cited

U.S. PATENT DOCUMENTS

| | | | |
|---|---|---|---|
| 5,647,002 A | 7/1997 | Brunson | |
| 5,781,901 A | 7/1998 | Kuzma | |
| 5,903,723 A | 5/1999 | Beck et al. | |
| 5,911,776 A | 6/1999 | Guck | |
| 5,923,846 A | 7/1999 | Gage et al. | |
| 5,987,504 A | 11/1999 | Toga | |
| 6,021,198 A | 2/2000 | Anigbogu et al. | |
| 6,101,531 A * | 8/2000 | Eggleston et al. | 709/206 |
| 6,223,213 B1 * | 4/2001 | Cleron et al. | 709/206 |
| 6,275,850 B1 | 8/2001 | Beyda et al. | |
| 6,356,937 B1 | 3/2002 | Montville et al. | |
| 6,366,949 B1 | 4/2002 | Hubert | |
| 6,374,291 B1 | 4/2002 | Ishibashi et al. | |
| 6,424,996 B1 * | 7/2002 | Killcommons et al. | 709/206 |
| 6,438,585 B2 | 8/2002 | Mousseau et al. | |

(Continued)

FOREIGN PATENT DOCUMENTS

EP 1282300 2/2003

OTHER PUBLICATIONS

Malik; Advisory Action mailed Jul. 29, 2004 for U.S. Appl. No. 09/563,928, filed May 4, 2000.

(Continued)

*Primary Examiner* — Alina N. Boutah
(74) *Attorney, Agent, or Firm* — Thomas, Kayden, Horstemeyer & Risley, LLP

(57) ABSTRACT

Disclosed are methods and systems for compressing data communicated in an electronic message. Files attached to an electronic communication are compressed based on an examination of the file type; and an identification of an alternative compressed file type. Accordingly, the first (original) file type is compressed into a second preferred, compressed file type for the purpose of streamlining the package to be delivered in the communication.

18 Claims, 16 Drawing Sheets

U.S. PATENT DOCUMENTS

| | | |
|---|---|---|
| 6,449,658 B1 | 9/2002 | Lafe et al. |
| 6,453,338 B1 | 9/2002 | Shiono |
| 6,463,463 B1 | 10/2002 | Godfrey et al. |
| 6,501,852 B1 | 12/2002 | Clark et al. |
| 6,542,936 B1 | 4/2003 | Mayle et al. |
| 6,549,957 B1 | 4/2003 | Hanson et al. |
| 6,622,161 B1 | 9/2003 | Jensen |
| 6,697,844 B1 | 2/2004 | Chan et al. |
| 6,714,791 B2 | 3/2004 | Friedman |
| 6,771,382 B1 | 8/2004 | Misawa et al. |
| 6,842,768 B1 | 1/2005 | Shaffer et al. |
| 6,871,216 B2 | 3/2005 | Miller et al. |
| 7,012,708 B2 | 3/2006 | Tamaru |
| 7,016,899 B1 | 3/2006 | Stern et al. |
| 7,023,974 B1 | 4/2006 | Brannam et al. |
| 7,024,460 B2 | 4/2006 | Koopmas et al. |
| 7,089,286 B1 | 8/2006 | Malik |
| 7,111,142 B2 | 9/2006 | Spencer et al. |
| 7,444,381 B2 | 10/2008 | Malik |
| 7,451,180 B2 * | 11/2008 | Warren et al. ............ 709/203 |
| 7,451,237 B2 * | 11/2008 | Takekawa et al. ......... 709/247 |
| 7,627,637 B2 | 12/2009 | Malik |
| 2001/0025300 A1 | 9/2001 | Miller et al. |
| 2002/0131561 A1 | 9/2002 | Gifford et al. |
| 2003/0023695 A1 | 1/2003 | Kobata et al. |
| 2003/0028606 A1 * | 2/2003 | Koopmans et al. ........ 709/206 |
| 2003/0028607 A1 | 2/2003 | Miller et al. |
| 2003/0081252 A1 | 5/2003 | Silverbrook et al. |
| 2003/0208546 A1 | 11/2003 | DeSalvo et al. |
| 2004/0025057 A1 | 2/2004 | Cook |
| 2004/0054847 A1 | 3/2004 | Spencer et al. |
| 2004/0073619 A1 | 4/2004 | Gilhuly et al. |
| 2004/0148356 A1 | 7/2004 | Bishop, Jr. et al. |
| 2004/0205205 A1 | 10/2004 | Patterson |
| 2004/0255048 A1 | 12/2004 | Lev Ran et al. |
| 2005/0021635 A1 | 1/2005 | Graham et al. |
| 2005/0021648 A1 | 1/2005 | Ogasawara et al. |
| 2005/0021963 A1 | 1/2005 | Tomkow |
| 2005/0033855 A1 | 2/2005 | Moradi et al. |
| 2005/0041266 A1 | 2/2005 | Silverbrook et al. |
| 2005/0044158 A1 | 2/2005 | Malik |
| 2005/0091321 A1 | 4/2005 | Daniell et al. |
| 2005/0188026 A1 | 8/2005 | Hilbert et al. |
| 2005/0193079 A1 | 9/2005 | Brown et al. |
| 2005/0210111 A1 | 9/2005 | Fukudome |
| 2005/0267943 A1 | 12/2005 | Castaldi et al. |
| 2005/0275871 A1 | 12/2005 | Baird et al. |
| 2006/0173848 A1 | 8/2006 | Peterson et al. |

OTHER PUBLICATIONS

Malik; Examiner Interview Summary mailed Feb. 8, 2005 for U.S. Appl. No. 09/563,928, filed May 4, 2000.
Malik; Examiner Interview Summary mailed Dec. 20, 2005 for U.S. Appl. No. 09/563,928, filed May 4, 2000.
Malik; Final Rejection mailed Mar. 12, 2004 for U.S. Appl. No. 09/563,928, filed May 4, 2000.
Malik; Final Rejection mailed Jun. 9, 2005 for U.S. Appl. No. 09/563,928, filed May 4, 2000.
Malik; Non-Final Rejection mailed Oct. 3, 2003 for U.S. Appl. No. 09/563,928, filed May 4, 2000.
Malik; Non-Final Rejection mailed Oct. 7, 2005 for U.S. Appl. No. 09/563,928, filed May 4, 2000.
Malik; Non-Final Rejection mailed Dec. 2, 2004 for U.S. Appl. No. 09/563,928, filed May 4, 2000.
Malik; Notice of Allowance and Fees Due mailed Mar. 24, 2006 for U.S. Appl. No. 09/563,928, filed May 4, 2000.
Malik; U.S. Appl. No. 09/563,928, filed May 4, 2000.
Malik; Final Rejection mailed Aug. 21, 2007 for U.S. Appl. No. 10/959,632, filed Oct. 6, 2004.
Malik; Non-Final Rejection mailed Jan. 22, 2008 for U.S. Appl. No. 10/959,632, filed Oct. 6, 2004.
Malik; Non-Final Rejection mailed Mar. 9, 2007 for U.S. Appl. No. 10/959,632, filed Oct. 6, 2004.
Malik; Notice of Allowance mailed Jun. 26, 2008 for U.S. Appl. No. 10/959,632, filed Oct. 6, 2004.
Malik; U.S. Appl. No. 10/959,632, filed Oct. 6, 2004.
Online Education Using WebCT: Zip Files in WEBCT. Printed from http://www.csus.edu/uccs/webct/faculty/doc/zip on Sep. 16, 2003.
Shadovitz; Mac Efficiency 101: E-mail Attachments; Dec. 1999; Printed from http://www.macefficiency.com; pp. 1-5.

* cited by examiner

| FILE NAME | FILE TYPE | COMPRESSIBILITY | UNCOMPRESSED | COMPRESSED |
|---|---|---|---|---|
| 1. ENGINEERING REPORT | WORD PROCESSING | 40 | 300 | 180 |
| 2. DEVELOPMENT COSTS SPREADSHEET | SPREADSHEET | 25 | 100 | 75 |
| 3. APPARATUS PICTURE | BITMAP | 5 | 400 | 380 |
| 4. PRODUCT PICTURE | BITMAP | 5 | 450 | 427 |
| 5. PROMOTION VIDEO | VIDEO | 15 | 350 | 298 |

FIG. 6A

| COMPRESSED | UNCOMPRESSED | TOTAL SIZE |
|---|---|---|
| 1, 2, 3, 4, 5 |   | 1360 |
| 2, 3, 4, 5 | 1 | 1480 |
| 1, 3, 4, 5 | 2 | 1385 |
| 1, 2, 4, 5 | 3 | 1380 |
| ⋮ | ⋮ | ⋮ |
| 1, 2 | 3, 4, 5 | 1455 |
| 1, 5 | 2, 3, 4 | 1428 |
| 2, 4, 5 | 1, 3 | 1500 |
| ⋮ | ⋮ | ⋮ |

| ATTACHMENT FILE TYPE | COMPRESSED FILE TYPE |
|---|---|
| .BMP | .JPG |
| .PPT | .ZIP |
| .DOC | .ZIP |
| .RTF | .TXT |

FIG. 12

DATA COMPRESSION IN ELECTRONIC COMMUNICATIONS

CROSS-REFERENCE TO RELATED APPLICATION

This application is a continuation of U.S. application Ser. No. 10/959,632, entitled "Data Compression in Electronic Communications," filed Oct. 6, 2004, which is a continuation-in-part of U.S. application Ser. No. 09/563,928, entitled "Method and Apparatus for Compressing Attachments to Electronic Mail Communications for Transmission," filed May 4, 2000 and issued as U.S. Pat. No. 7,089,286 on Aug. 8, 2006, all of which are hereby incorporated by reference.

COPYRIGHT NOTICE

A portion of the disclosure of this patent document and its figures may contain material subject to copyright protection. The copyright owner has no objection to the facsimile reproduction by anyone of the patent document or the patent disclosure, but otherwise reserves all copyrights whatsoever.

TECHNICAL FIELD

The present disclosure relates to the transmission of electronic communications over communication networks, and more particularly, to compression of attachment files to electronic communications.

BACKGROUND

During the past decade, electronic communications (such as electronic messaging or "e-mail") has become an indispensable tool for facilitating business and personal communications. Through computer networking systems such as local-area networks ("LAN"), wide-area networks ("WAN"), and the world-wide web ("WWW"), network users can send and receive notes, messages, letters, etc., to communicate with others who are in the same office or perhaps in remote locations across the world. For example, most e-mail application programs allow a user to attach a file to be sent along with a message as an "attachment." Attachment files might include word processing documents, graphics files, audio or video, multimedia presentation files, executable programs, spreadsheet reports, etc. A recipient will receive the e-mail message plus any attached files, which may then be opened and accessed through the appropriate application software.

In many applications, for example, it is preferable to send documents through e-mail attachments instead of as a facsimile because the recipient can then store, edit, and print an original file. For long-distance communications, it is also less costly to send documents via e-mail as compared with facsimile transmissions. For many projects, it is appropriate or desirable for a user to send a plurality of attachments to another at one time. The files to be included as attachments may each be of the same type, or may be of a multitude of different types. For example, if a user wishes to send a plurality of files via electronic mail about a particular project, the user may attach a written report about the project, a spreadsheet analysis, a multimedia presentation, and a video of a product to be developed by the project. In such a case, each of these files is attached to the same e-mail communication for transmission to a desired recipient.

Although many currently available e-mail application programs enable a user to send attachments as part of an e-mail communication, there are several problems that users often encounter when sending e-mail attachment files. If the total size of the group of attachment files exceeds a preset size limit, a user's e-mail system or a recipient's e-mail system will cancel delivery of the e-mail communication. It is common for a user to receive a "returned e-mail" or an "undeliverable" notification from the user's e-mail system gateway or the gateway from the intended recipient because the attachment files are too large. Network administrators set a size limit for e-mail communications in order to reduce traffic that slows the network. Accordingly, when a sender receives an "undeliverable" message in response to an attempt to transmit a plurality of attachments, the sender must reconfigure the e-mail by guessing which one or combination of the attachment files renders the total size of the e-mail communication unacceptably large. This requires the user to divide the single e-mail communication into multiple e-mails, run separate compression software to compress some or all of the files, or do a combination of the two. The decision as to which files are compressed or omitted from the communication is determined by process-of-elimination, as the sender must repeatedly attempt to send the e-mail until the sender no longer receives an "undeliverable" notification.

In addition to traditional e-mail systems, other systems for communicating electronic messages, such as instant messaging systems and wireless electronic messaging systems suffer from these same shortcomings. These problems significantly reduce the benefits of electronic communication systems and may negatively affect a user's productivity when engaging in electronic communications.

Thus, a heretofore unaddressed need exists in the industry to address the aforementioned deficiencies and inadequacies.

SUMMARY

In view of the difficulties encountered with sending attachments to electronic communications described above, there is a need for a method and system for assisting a user to properly configure an electronic communication to include the transmission of desired attachment files.

According to exemplary embodiments, methods, systems, and machine-readable mediums are provided for selectively compressing attachment files in an electronic communication. One embodiment, among others, of such a method includes examining the content of a communication received from a sender. In particular for one exemplary embodiment, this communication is examined for compressibility by comparing the file types of the attachments against a listing of compressible file types. Further, the content of the communication is compressed based on the type of content of the communication.

For some embodiments, among others, the sender of the communication is optionally presented with a prompt asking the sender to either accept or decline the compression. Optionally, this might include an indication to the sender of additional information that may assist the sender in deciding whether to accept or decline the compression offer. This information may include comparisons of characteristics of the original attachment file as compared against the proposed compressed version. Examples of these characteristics may include estimated file size; estimated time to download the message at the recipient's end of the communication, assuming various connection speeds for the recipient; and estimated content degradation characteristics (if any, for example, a quantification such as pixels per inch comparison original vs. compressed image files). If compression is accepted by the sender, a compression module then executes a compression algorithm on the original attachment to convert it to a compressed file in preparation for transmission. The compressed communication is then sent to at least one recipient Further, one embodiment, among others, includes a device for compressing data in a communication transmitted in an electronic messaging system. Such a device may include a module for examining the content of a received communication; and a compression module for compressing the content of the communication based on the type of content. The compressed communication is transmitted to at least one recipient.

Further, in some embodiments, the device contains a compressible file type table or other equivalent listing of types of files that can be compressed by the device in preparation for transmission. This table or equivalent also contains a listing of compressed file types for each compressible type of file. The device may also be a communication device, in some embodiments. In particular, for various embodiments, the device may be either a wireless or a wireline device.

BRIEF DESCRIPTION OF THE DRAWINGS

These and other features, aspects, and advantages of the embodiments of the present disclosure are better understood when the following Detailed Description is read with reference to the accompanying drawings, wherein:

FIG. 6A is a table of files with corresponding compressed and uncompressed file sizes, according to one embodiment of the present disclosure;

FIG. 6B is a table of combinations of compressed and uncompressed files provided in FIG. 6A, with the corresponding total size, according to one embodiment of the present disclosure;

FIG. 12 is a diagram showing one example, among others, of a compressibility table utilized in FIG. 11;

DETAILED DESCRIPTION

Figure 1:
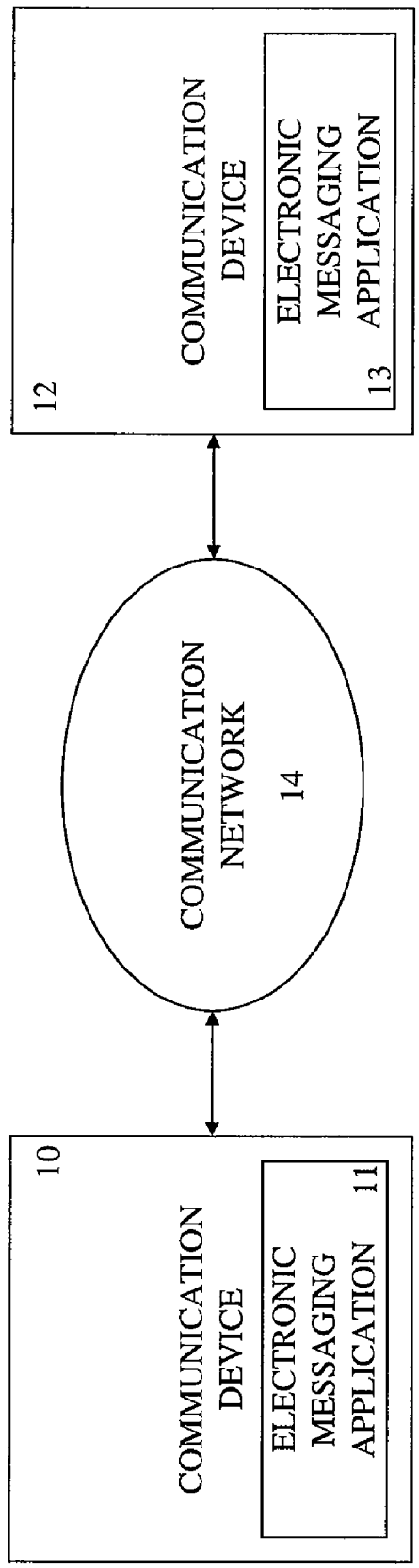
FIG. 1 is a schematic diagram of one embodiment, among others, of a system for compressing data in a communication of the present disclosure.

Exemplary embodiments of the present disclosure will now be described in more detail with reference to the figures. FIG. 1 is a schematic diagram of a communications network system, in which communication device 10 is coupled to communication device 12 through a communication network 14 to facilitate electronic communications (e.g., electronic messaging or e-mail, instant messaging, etc.) with attachments. For this particular embodiment, communication device 10 has an electronic messaging application 11 that permits the communication device to send electronic communications using network 14. Likewise, communication device 12 has an electronic messaging application that permits the communication device to receive electronic communications from network 14. The term communication device in this description is not limited to any particular type of communication device, and may be any wireline or wireless device capable of sending and receiving electronic communications. The term electronic communications in this description is not limited to any particular type of communication, and includes e-mail, instant messaging, etc. Network 14 can be in the form of a wired network or a wireless network. The network may be a simple, single communication path, or it may include one or several LAN or WAN, the world wide web, or any combination thereof. Communication devices 10 and 12 may be the only communication devices connected to the network 14, or the network may be shared by many other communication devices.

Figure 2:
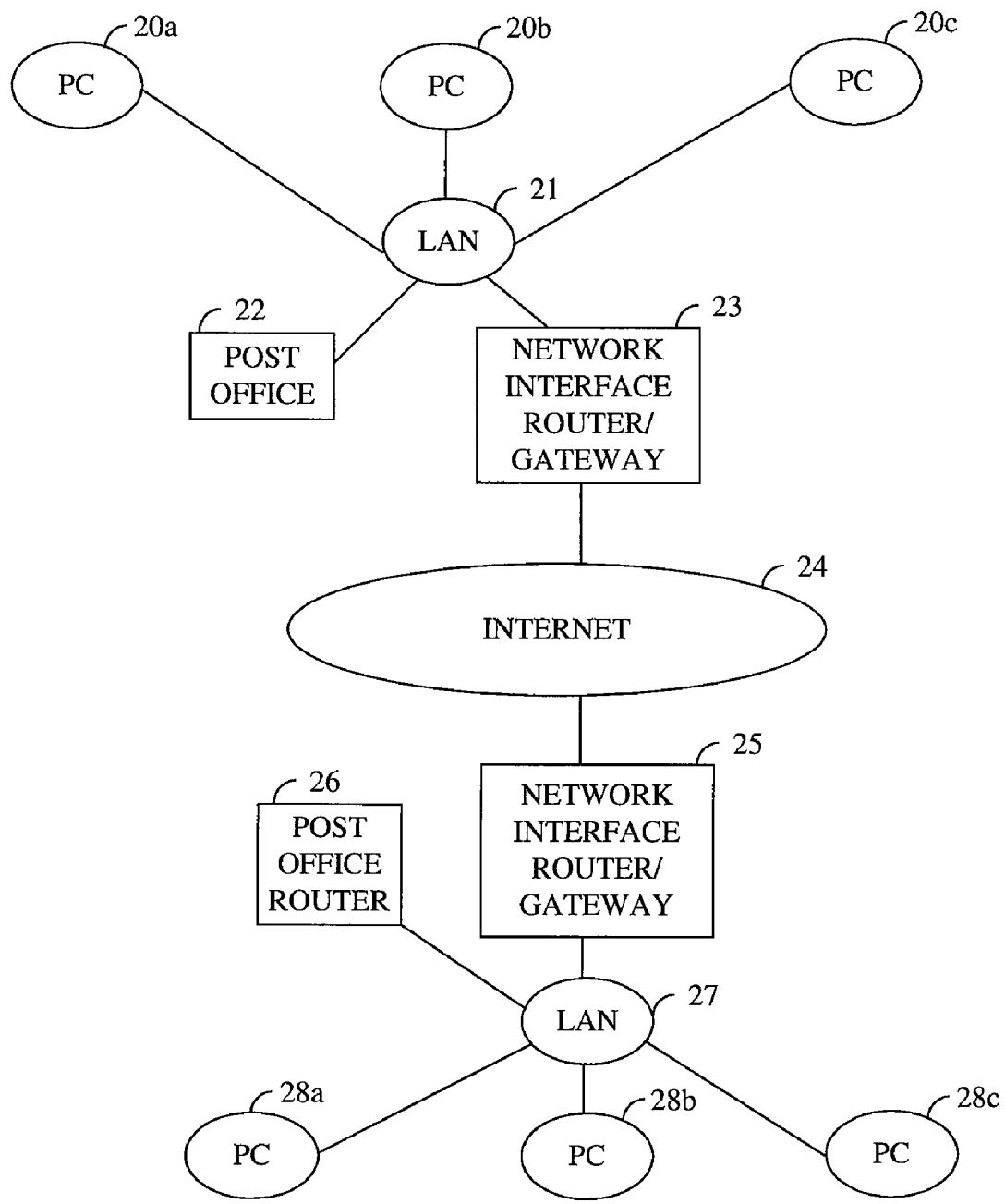
FIG. 2 is a schematic diagram of one embodiment, among others, of a networked computer system in accordance with FIG. 1.

FIG. 2 is a schematic diagram of a specific networked computer system in accordance with one embodiment of the present disclosure, wherein an electronic communication, in the form of an e-mail communication, with an attachment is transmitted from one communication device (in the form of a computer 20a) to another communication device (in the form of a computer 28c) via the Internet 24. Computers 20a, 20b, and 20c are connected together via a local area network (LAN) 21. Post office server 22 connects to LAN 21 for transmitting e-mail both within and outside the LAN network. A world wide web hyper text transport protocol ("HTTP") server 23 ("web server") is also connected to the LAN 21 for facilitating communication between any of the computers 20a, 20b, and 20c with other computer systems via the Internet 24. Likewise, computers 28a, 28b, and 28c are connected together through LAN 27, which is also connected to a post office server 26 and web server 25.

When a user stationed at computer 20a sends an e-mail communication having a message and one or more attachment files, an e-mail application program running on computer 20a performs initial formatting and then forwards the communication to the LAN 21 for transmission. The LAN 21 receives the communication and forwards it to post office server 22. Post office server 22 first determines whether the e-mail is a local communication within the LAN network 21. If so, the LAN 21 sends a notification message to the computer within the network that corresponds with the destination address. When a user at that computer elects to read the e-mail communication, the LAN 21 then forwards the e-mail communication directly to the destination computer.

If post office server 22 determines that the e-mail communication is to be sent outside of LAN 21, such as to computer 28c, the e-mail communication is forwarded to network router 23. The router 23 first re-formats the files in the e-mail communication for transmission along the Internet, in formats such as MIME or UUENCODE. The files are then transmitted from the gateway associated with LAN 21 to an Internet service provider (ISP). The e-mail communication is routed through a network toward an ISP for router 25 associated with LAN 27. The e-mail communication is then forwarded to the post office server 26 for LAN 27. Post office server 26 generates a notification message for computer 28c. When the user elects to review the e-mail communication, it is transmitted along the LAN 27 to the destination computer.

If the e-mail communication described with respect to FIG. 2 contains one or more large attachments, it is possible that either LAN 21 or LAN 27 will not allow the transmission of the e-mail communication in its standard format because of size constraints. However, compression of one or more of the attachment files may sufficiently reduce the size of the e-mail communication below the limits imposed by the LANs. The present disclosure provides one embodiment, among others, for selectively compressing attachment files, according to the compressibility of the file types, to facilitate the transmission of e-mail communications, for example. Only the minimum number of files are compressed as required for transmission. By compressing a subset of the attached files, the system transmits the e-mail communication without unnecessarily dividing the e-mail into separate e-mails, which would create delays. Further, by only compressing the files necessary to affect transmission, the recipient does not have to wait to decompress files that did not need to be compressed. Accordingly, the selective compression of attachment files maximizes the speed and efficiency of e-mail communications. The attachment files can be compressed by any of several known compression applications, using known algorithms, including PKZIP. The system can also use different compression applications according to the type of file to be compressed.

The system for automatically compressing attachment files in e-mail communications is now explained with reference to the e-mail communications system 30 in FIG. 3. E-mail interface 31 provides a user interface for composing e-mail communications. Files that are selected to be attachments are stored in memory 35a, and are linked to the e-mail interface through data structures stored in 35b. Compressibility table 34 provides a database of a plurality of different types of files and the degree of compressibility for each respective type of file. Examples of file types might include word processing files, CAD files, video files, presentation software application files, picture files, etc. The compressibility of each of the different types of files is preferably provided in table 34 as a percentage by which the corresponding file is reduced in size after compression. The compressibility table 34 is connected to an e-mail attachment configurator module 33 for determining which of the attachment files are to be compressed. Compression module 36 performs the compression of the attachment files selected to be compressed. The compressed files are stored in memory 35b. Once the e-mail communication is configured for transmission, e-mail interface 31 forwards the e-mail message and attachment files to network interface 32.

The method of selectively compressing attachment files according to the preferred embodiment is described with reference to FIG. 4. A user composes an e-mail communication having one or more attachments. Once the user requests to transmit the e-mail communication, as in step 40, the system determines the file type for each attachment file designated with the e-mail communication, as in step 41. Information regarding the compressibility of one of the designated attachment files is loaded in step 42 into the e-mail attachment configurator module 33 of FIG. 3. The system checks if the compressibility of that file type is above a certain threshold, in step 43. If it is, the file is then compressed in step 44. The process of loading compression information and selectively compressing files continues until each file has been analyzed. When the system determines that no other files remain to be analyzed, in step 45, the e-mail communication is transmitted, in step 46.

The threshold according to which the system decides whether to compress a file can be automatically calculated, predetermined, or user-selected. An automatically calculated system changes the threshold point according to the relative amount of traffic on the network. The threshold point is used in step 43 of FIG. 4 for determining whether an attachment file is to be compressed. For example, in the late evening, when a LAN for a business is generally underutilized, the threshold for compressing files can be set to be relatively large such that few files are compressed. This allows for faster transmission because the system compresses comparatively fewer files before transmission. The recipient of the e-mail communication will also have the benefit that fewer files need to be decompressed. In contrast, during the peak hours on the network, the compression threshold is lowered, such that a majority of the attachment files are compressed before transmission along the network. This reduces the number of packets sent along the network during busy time periods, thus allowing for more efficient usage. A detector connected to the network server (not shown in FIG. 3) detects the relative network traffic, and sends a signal regarding the traffic information to network interface 32 in FIG. 3. The detector determines the relative amount of traffic on the network by a number of known methods. This information is then provided to the e-mail attachment configuration module 33 from network interface 32.

A predetermined system can be configured to compress those files that are capable of noticeable compression. It can additionally include time-of-day features, in which the compression threshold, used in step 43 of FIG. 4, varies according to the time. For example, it is commonly known that a LAN for a typical business is busiest during the mid-morning, the time period immediately after lunch, and the time period immediately before 5:00 p.m. The compression threshold can be adjusted to accommodate for higher network traffic during the peak times. During peak times, the compression threshold is lowered, such that most files that are capable of noticeable compression will be compressed. In this manner, users who do not wish to transmit compressed files in an e-mail communication will be encouraged to send bulky e-mail communications during off-peak hours.

Figure 4:
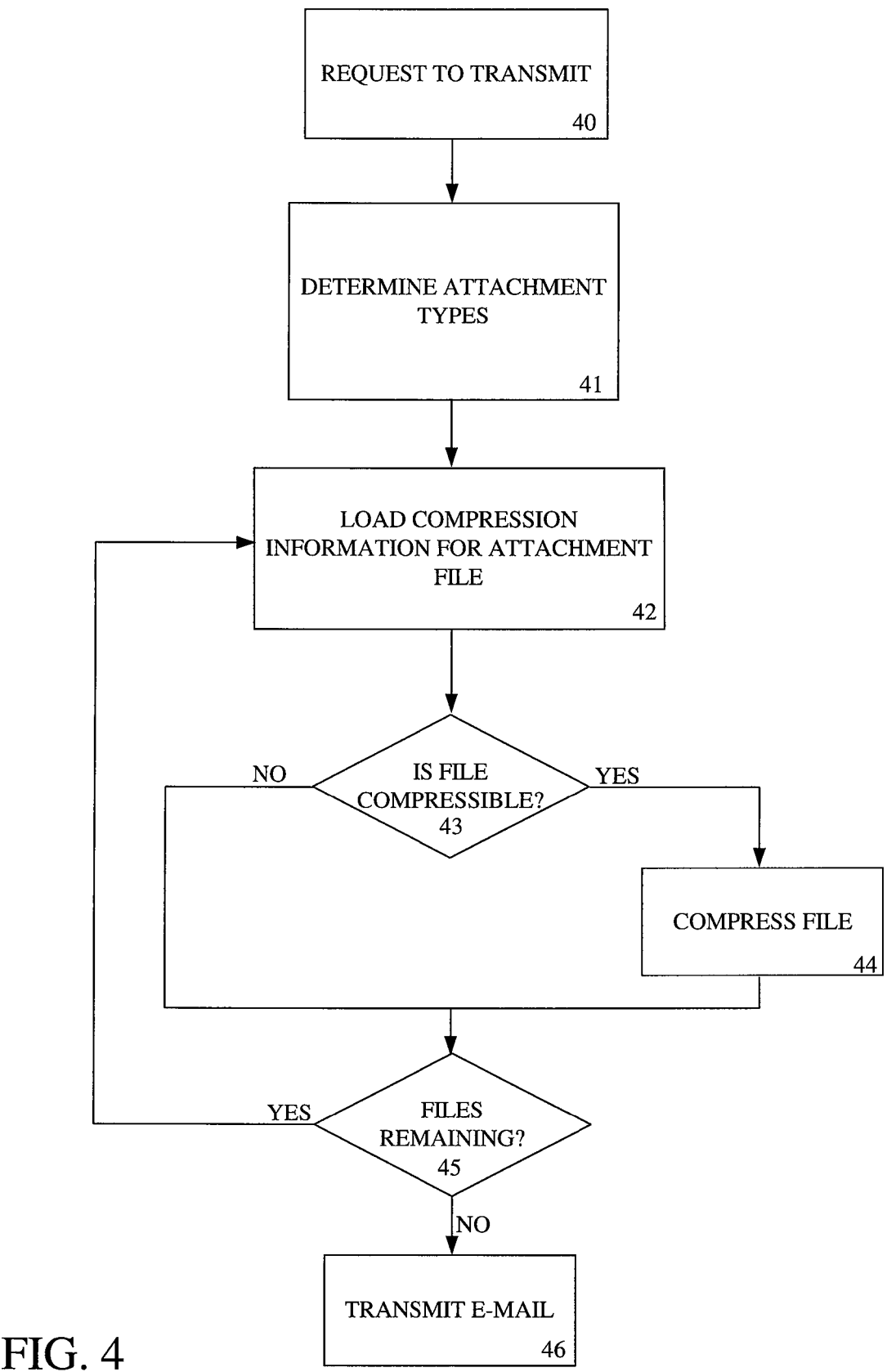
FIG. 4 is a flowchart diagram of steps for selectively compressing attachment files according to one embodiment of the present disclosure.

Alternatively, a user can select the compression threshold used in step 43 of FIG. 4 based upon the user's knowledge of the number of files that are to be attached, or the relative priority of the message. As an example of a user-selected compression threshold, the e-mail application may be configured to provide a "compressibility selector" with a "high, medium, or low" selection. Continuing further, the "medium" selection, for example, could be programmed to require compression of all file types that can be compressed by 15% or more. If the user is aware that the e-mail communication includes a large number of files, the user will likely opt for a low compression threshold to avoid a delivery failure. However, if the user is only sending a single attachment file in an urgent e-mail, he may opt for a high compression threshold, even if the file type is very compressible, in order to avoid delays resulting from compression and decompression.

Figure 3:
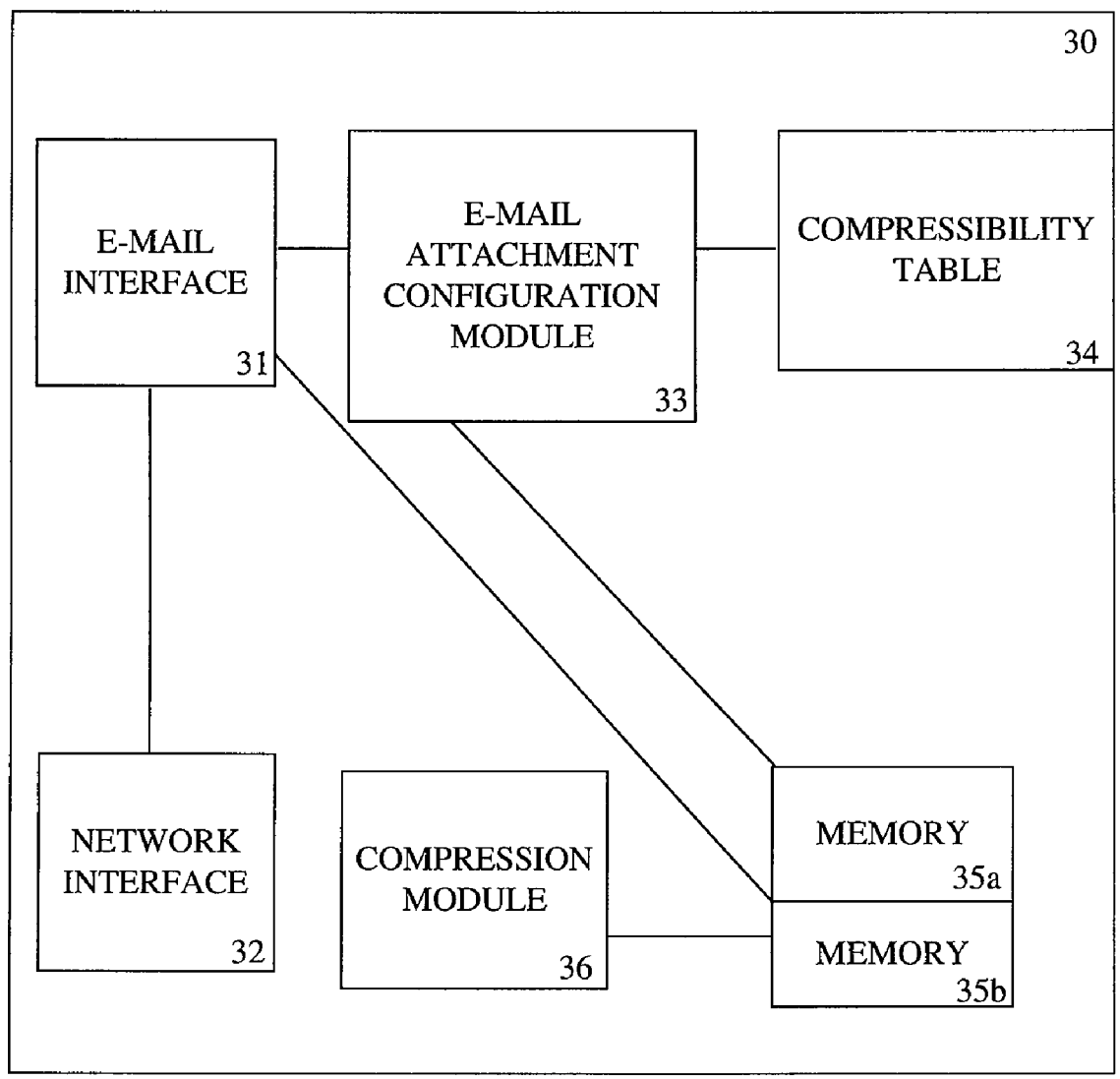
FIG. 3 is a schematic diagram of an e-mail communications system according to an embodiment of the present disclosure.

In a second embodiment, the e-mail attachment configuration module 33 in FIG. 3 determines an optimal configuration for transmitting a group of attachments according to a size limit determined at the network level. A method for determining the optimal configuration is now described with reference to FIG. 5. Once a user requests to transmit an e-mail communication, in step 50, the e-mail communications system determines each of the file types for the files designated as attachments, in step 51. The compressibility of each of the attached files is determined in step 52, by reference to the compressibility table 34 in FIG. 3. In the alternative, the system compresses each of the files to compare, for each file, the compressed and uncompressed sizes. In step 53, the attachment configuration module 33 in FIG. 3 loads the size limit, as determined by the network, via network interface 32. The size limit may be a fixed, predetermined number, an automatically calculated number, or a user-specified number, each of which operate in the same manner as the compression threshold described above in the first embodiment and explained in further detail below.

Once information is known regarding the compressibility of each attachment file, the size of each attachment file when uncompressed, and the size limit for the network, the e-mail attachment configuration module can determine the optimal configuration for the e-mail, as in step 54. The module may calculate, based upon file type, the size of each file designated as an attachment when compressed. The module devises every possible combination of compressed and uncompressed attachment files, and calculates the resulting total size of the e-mail communication. The combination of compressed and uncompressed files that is at the size limit, or under the size limit by the minimum amount, is then selected for transmission.

An example of a calculation for the optimal configuration for transmission of a group of e-mail attachments is provided with reference to the tables in FIGS. 6A and 6B. In this example, there are five different files that are designated to be attached to an e-mail communication. Each file is identified in FIG. 6A by type, for which compressibility (by percentage) is provided from a compressibility table. The uncompressed size of the file (in kilobytes) is detected, from which the size of the file (in kilobytes) when compressed is calculated. In the alternative, where each file is compressed to evaluate compressibility, a compressibility percentage is not utilized. FIG. 6B shows a portion of the possible combinations of compressed and uncompressed files, and the total file size (in kilobytes) for each combination. As can be seen in this example, if the size limit is 1.5 megabytes, the optimal combination is that in which files 2, 4, and 5 are compressed, and files 1 and 3 remain uncompressed.

As referred to above, the e-mail size limit standard can be determined by the network, predetermined within the e-mail application, or specified by the user. When automatically calculated by the network, a size limit will be supplied through the network interface 32 in FIG. 3 periodically throughout the day according to the traffic along the network. For example, the network administrator may set the limits for the maximum e-mail size at 2.0 MB when the network is at 50% capacity, 1.5 MB when the network is at 75% capacity, and 1.0 MB when the network is at 95% capacity. There can be as many intervals as necessary to improve performance along the network. The capacity of the network is determined and supplied to the configuration module via the network interface. The network information relevant to the user's e-mail may concern the network traffic on the entire LAN, or just the traffic on the portion of the LAN the extends from the user's computer to the post office on the LAN.

At the present time, it is common for network administrators to set the network at one size limit for e-mail communications. Accordingly, if the network is set to only allow e-mail communications of, for example, 1 MB or less, the e-mail configurator module can be preset with a predetermined size threshold, to only allow files smaller than 1 MB.

The e-mail configurator module can also allow for a user-specified file size limit as an alternative to the automatically calculated limit or the predetermined limit. For example, if the sender knows that the recipient's LAN will not accept e-mail communications greater than 0.75 MB (which may be lower than the automatically calculated or predetermined limits) the sender may wish to specify this limit for calculating the optimal configuration. This will be also be helpful for the sender if, despite the automatic calculation or predetermined size limit, the e-mail communication is returned by the recipient's network as being undeliverable. A user-specified option provides an override to allow the user to provide the size limits necessary for delivery.

Depending upon the configuration of the recipient's e-mail communications system, the sender's e-mail configurator module can include additional capability to compress files according to the size limits imposed by the recipient's LAN. In e-mail communication systems that are generally available in the prior art, a user will receive an "undeliverable mail" message in response to an e-mail, if the size of the group of attachments in the e-mail exceeds a predetermined size limit. The "undeliverable" message typically does indicate the size limit for the recipient's LAN. The present disclosure provides an automatic reconfiguration and resending of a mis-sent message in response to an "undeliverable message" that indicates the size limit for the recipient's LAN. The e-mail communications system according to this embodiment additionally includes in the e-mail configuration module 33 of FIG. 3 a detector for detecting the receipt of a "undeliverable" notification. The subject heading of the "undeliverable" notification provides the size limit for the recipient's LAN. The sent e-mail is retrieved and reconfigured according to steps 51-56 in FIG. 5. In this application, the "E-Mail Size Limit Standards" is provided from the subject heading of the "undeliverable" notification message. This reconfiguration and resend feature can occur automatically, or the user interface 31 in FIG. 3 may prompt the user to authorize re-transmitting the e-mail communication.

Figure 7:
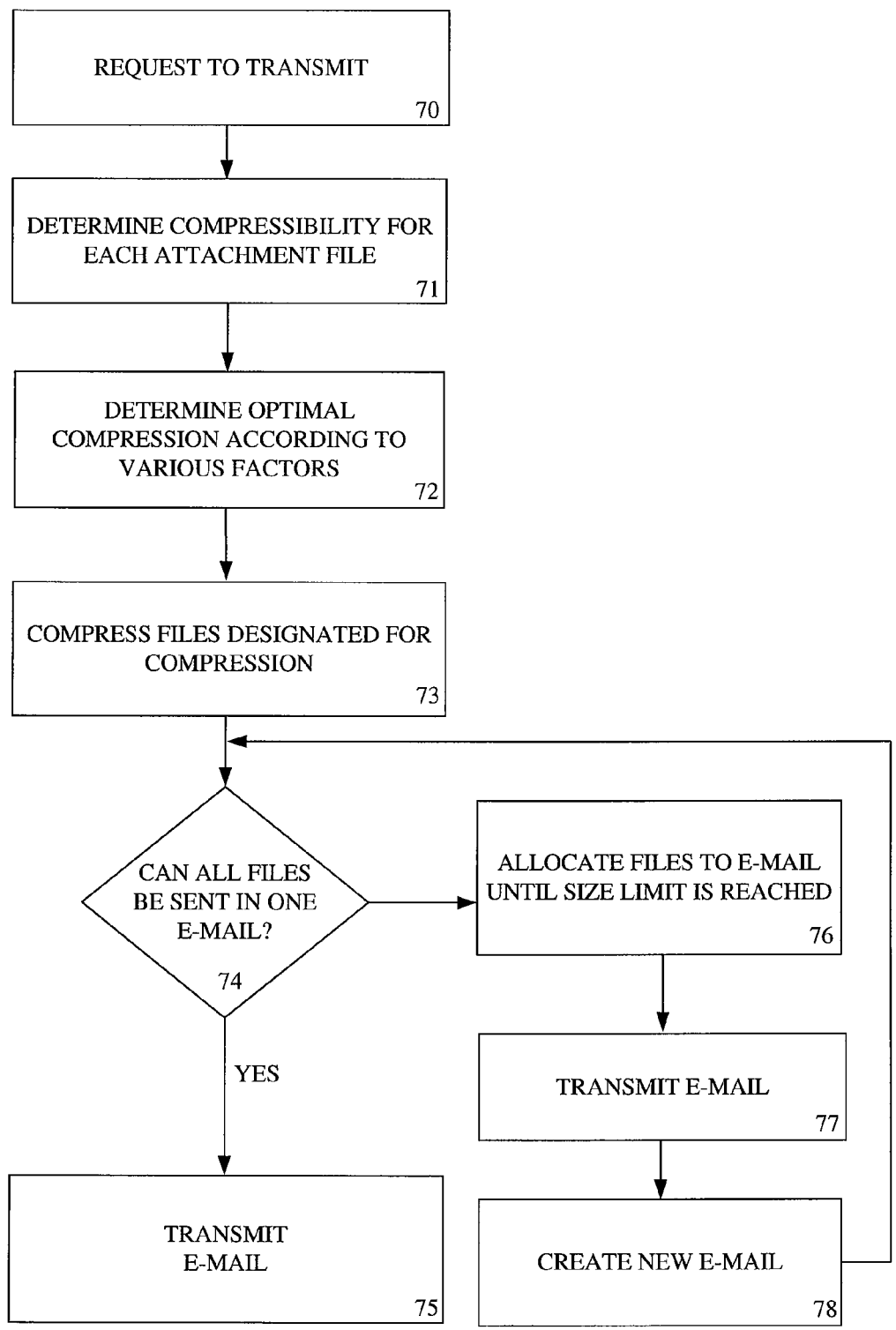
FIG. 7 is a flowchart diagram of steps for selective compressing attachment files and dividing e-mail communications according to an embodiment of the present disclosure.

The method described above for compressing attachment files by determining an optimal configuration according to an imposed size limit assumes that all files designated as attachments can be sent in a single e-mail communication. If the size of the collection of attachment files, even after compression, is too large to be transmitted in the same e-mail, the system divides the e-mail communication into multiple e-mails. FIG. 7 provides a flow diagram of the steps for selectively compressing attachments in an e-mail communication and for creating additional e-mails when necessary to ensure proper delivery.

In response to a request to transmit an e-mail communication, in step 70, the system then determines the compressibility of each attachment file, in step 71. This can be performed in accordance with a compressibility table, as described above, or by performing compression of each file. In step 72, the system then determines which files are to be compressed. As described above, the optimal compression for the group of attachment files may be determined according to the compressibility of each of the files, the size limit imposed on the e-mail communication, the urgency of the e-mail communication, the time of day that the e-mail is to be communicated, etc. The system then compresses those files that are designated for compression in step 73.

Based upon the size of the compressed and uncompressed files that are to be transmitted, the system can calculate in step 74 whether all of the files can be sent in a single e-mail communication. If the total size is within the size limitation, then the e-mail is transmitted in step 75. If the size limit is exceeded, the system allocates files to the first e-mail until the total size of the e-mail reaches the size limit, in step 76. This e-mail is transmitted in step 77. A new e-mail is then created in step 78. With the remaining compressed and uncompressed files to be transmitted, the system continues the cycle of checking whether the files can be transmitted in a single e-mail, or whether the files need to again be divided into separate e-mail communications, as shown in steps 74 and 76-78.

When an e-mail that includes one or more compressed files is transmitted, the system can also automatically provide an icon or a URL to a website containing software to decompress those files that are compressed. If the recipient's e-mail software package does not include decompression software to automatically decompress a file attachment, the user can easily access a website and download software to be able to access the attachment file.

Figure 5:
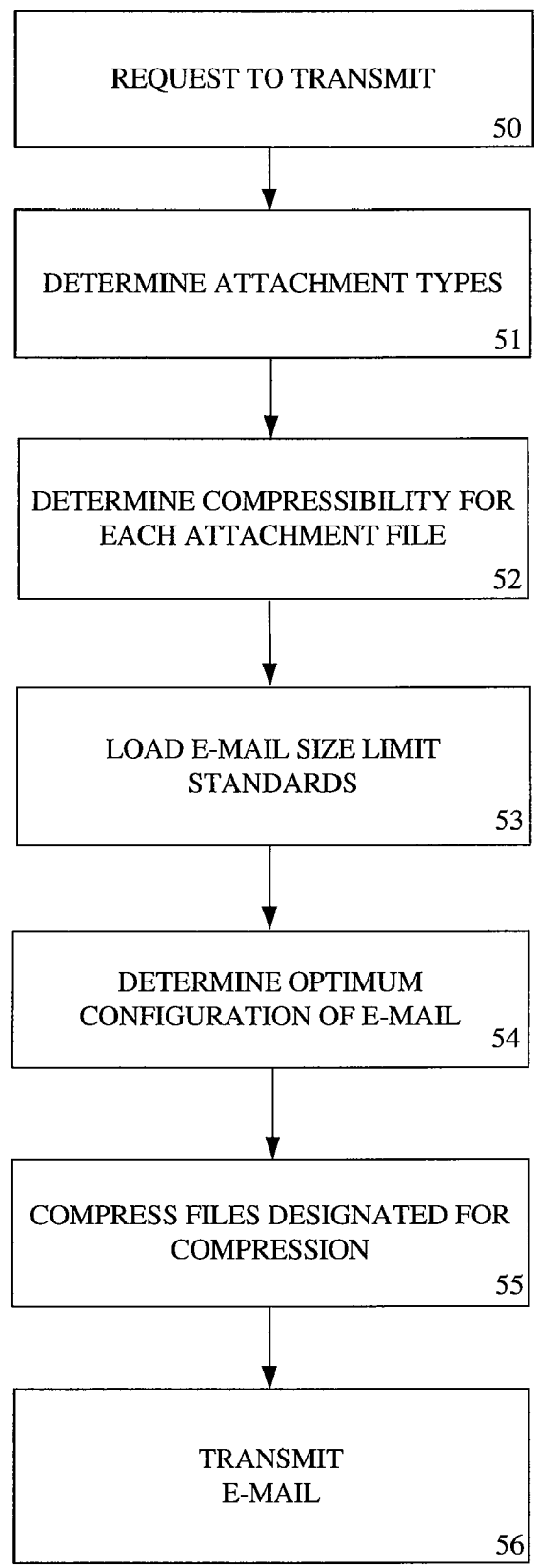
FIG. 5 is a flow diagram of steps for selectively compressing attachment files according to a size limit, according to an embodiment of the present disclosure.

As shown in FIG. 3, and as described in the flow diagrams provided in FIGS. 5 and 7, the e-mail communications system of the preferred embodiment determines whether files are to be compressed and performs the file compression at the user's workstation that is connected to the network. In an alternative embodiment, the e-mail attachment configuration module, compression module, compressibility table, etc. are provided in the e-mail server itself, and the methods of compressing the attachment files or dividing emails into separate e-mail communications as described in FIGS. 5 and 7 are performed by the e-mail server. In this embodiment, all of the attachment files are transmitted within the internal network as uncompressed files. However, the processing of the compression algorithms described in FIGS. 5 and 7 can be centralized in the e-mail server, which may have a faster processing speed.

Although select embodiments of the present disclosure can be used for configuring any e-mail communication that includes one or more attachment files, it can also be incorporated into a system for configuring groups of application files attached to an e-mail communication as a package. During the time that a user accesses user applications, the user can designate files to be a part of a new or an existing package of application files. The packages of application files, as defined by the user, can then be included as an e-mail attachment in a future e-mail communication. Before sending the e-mail communication, the system can compress the package of files in an optimal arrangement, according to the compressibility of the file types.

Figure 8:
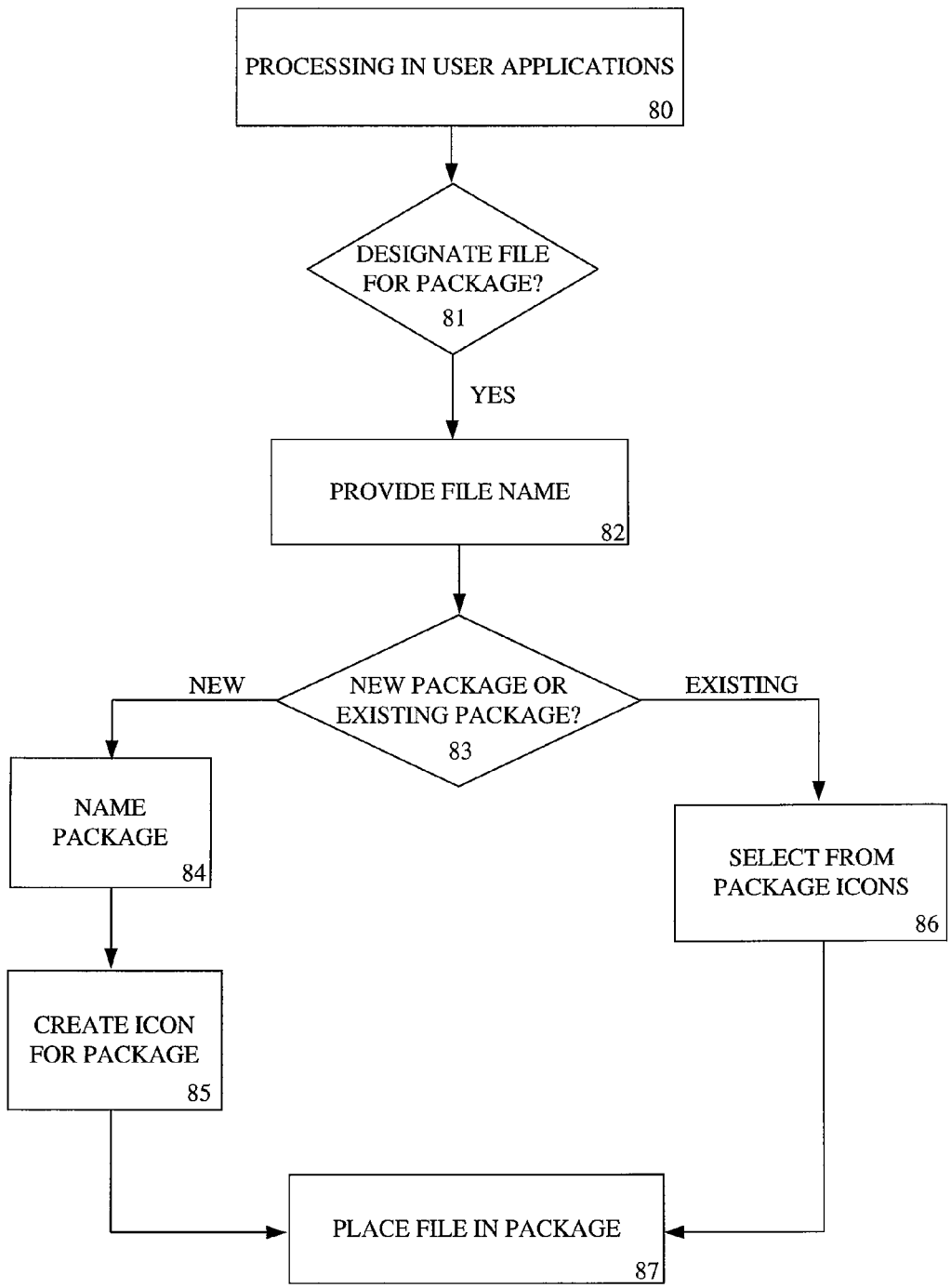
FIG. 8 is a flowchart diagram providing a method for designating an attachment file into a package according to an embodiment of the present disclosure.

FIG. 8 provides a flow diagram illustrating how the e-mail application interfaces with a user application to coordinate the composition of packages of designated files for attachments. A user opens a user application, as in step 80, and begins to process an application file in the normal course. In this context, processing may include seating a new file, or opening and editing an existing file. The application files may be in a text format or any graphics, audio/video, or multimedia-type format. Graphics files might include jpeg, tif, or gif files. At any time during processing of the file, the user may choose to designate the application file for a package, as in step 81. This may be done by selecting an icon that is overlaid onto the screen of the user application. Alternatively, the user application itself may incorporate a macro within its menu or in its "toolbar" for creating e-mail attachment packages.

If the user designates the file for an attachment, the user is then prompted to supply a file name, as in step 82. Under most circumstances, the user will wish to maintain the same name as that of the existing file, which can be provided as the default. However, the user may wish to change the name associated with the attachment file, in order to be more convenient or appropriate for the intended recipient of the attachment. For example, the user may name an application file according to an internal billing or reference code, but may choose to rename the designated attachment file as one that the recipient will recognize.

The user is then prompted to select an appropriate package for the designated file, in step 83. As one option, the user may choose to create a new package. If so, the system prompts the user to identify a package name, in step 84, and creates an icon that is to be associated with the package, in step 85. If the user wishes to add the attachment file to an existing package, the system prompts the user to select from a list of packages, by name or by icon, or to provide the desired package name, in step 86. In step 87, the user application file is then designated as an attachment for a particularly defined package.

Figure 9:
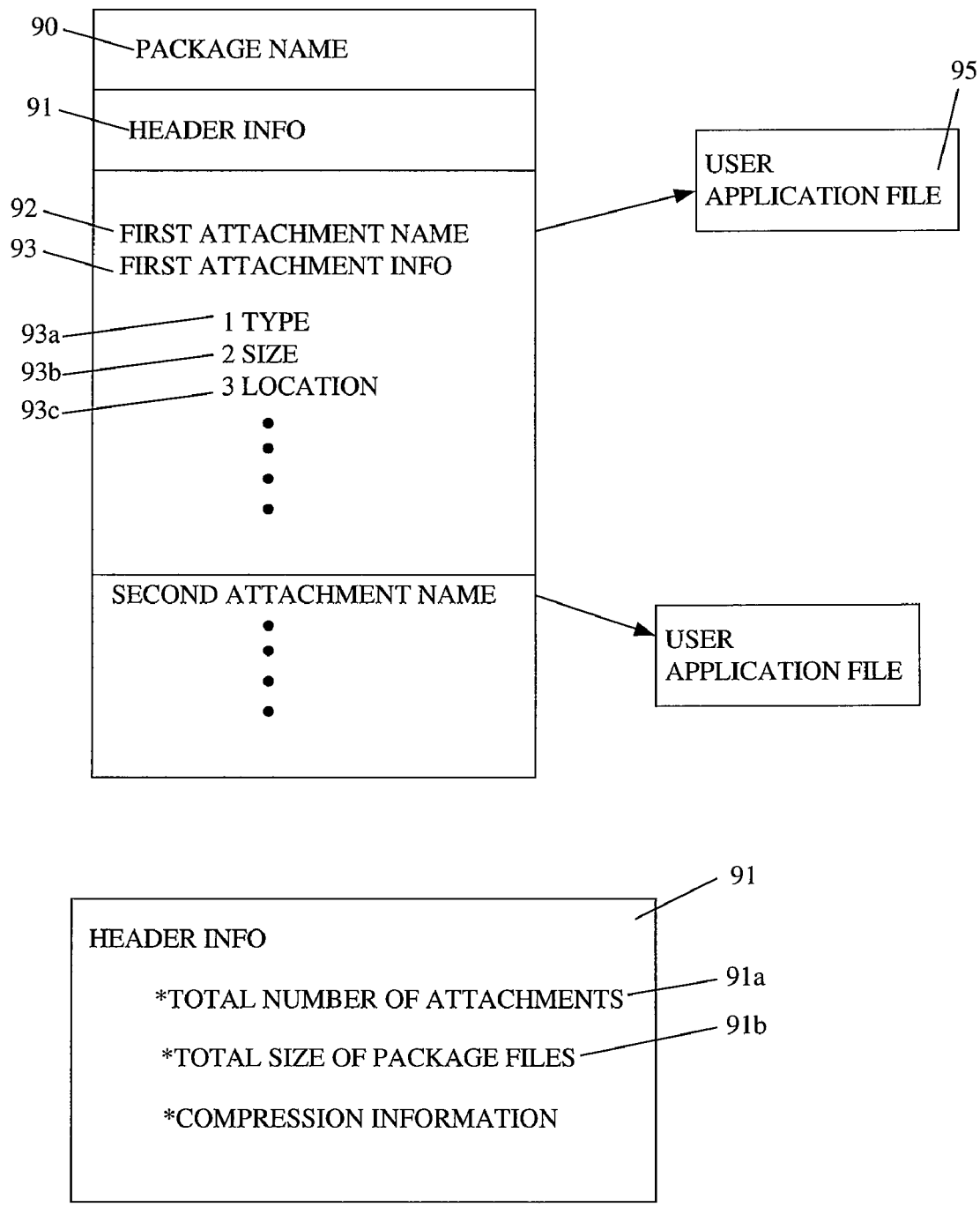
FIG. 9 is a schematic diagram illustrating a data structure for a package according to an embodiment of the present disclosure.

In accordance with one embodiment, a pointer or link is then associated between the application file and a data structure for the package, as illustrated in FIG. 9. The data structure contains the package name 90 defined to identify the package. The header information 91 stores information about the package itself, which may include the number of attachment files currently associated with the package 91a, the total size of the combination of attachment files 91b, and information regarding the capabilities for compressing the file. For each file designated as an attachment and associated with the package, the data structure includes the user-defined attachment name 92 (which may differ from the user application file name) and general attachment file information 93, including the file type 93a, file size 93b, file location 93c, etc. A pointer or link from the attachment information 93 to the user application file 95 is maintained.

Figure 10:
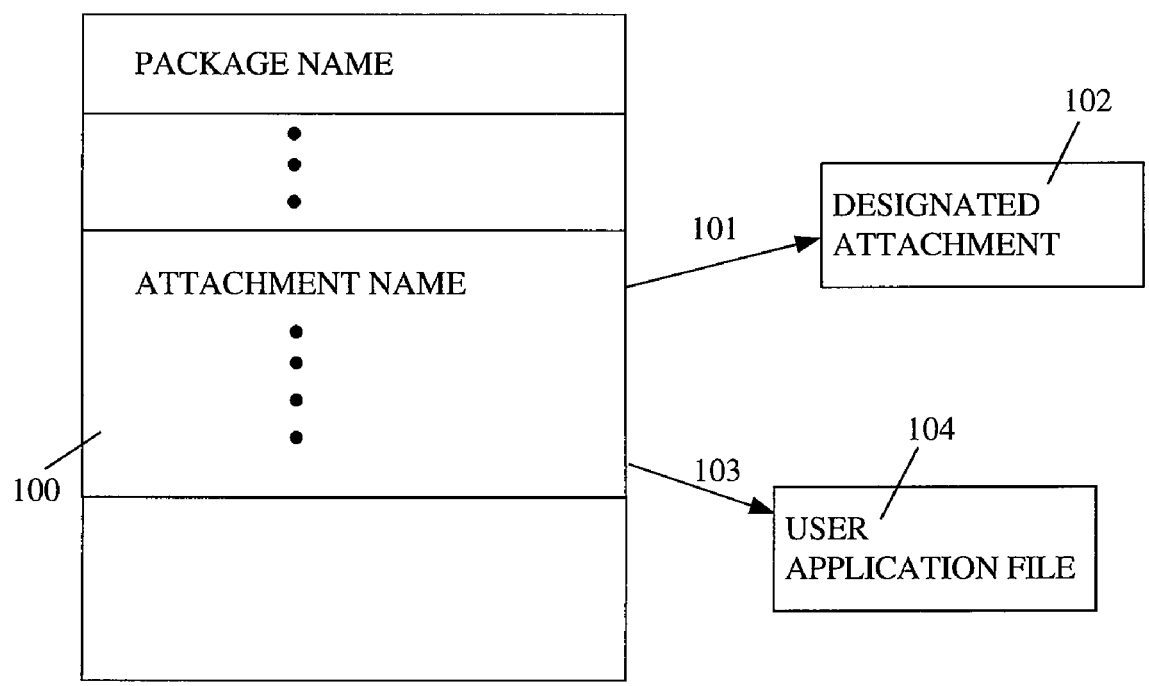
FIG. 10 is a schematic diagram illustrating a data structure for a package according to an alternative embodiment of the present disclosure.

In an alternative embodiment, a copy of the user application file is made and stored as a separate file. In this data structure, as shown in FIG. 10, the attachment information portion 100 maintains a link or pointer 101 to a new copy of the user application file, stored as designated attachment 102. In this embodiment, when a user application file is designated as an attachment, a copy is made of the user application file in its current form. Any subsequent edits to the user application after the user designates the file in a package are not automatically incorporated into the attachment file. However, because the user may desire to transmit the latest version of the user application, a second pointer is also maintained 103 to the user application file 104. When the user enters the e-mail application and requests to include a particular package as an attachment, the system can detect whether the user application file 104 has changed from the designated attachment 102, and the user can choose which file to include in the package. Although it is more cumbersome to store a separate copy of the user application file to be attached, this embodiment provides additional functionality for the user.

The attachments are compressed after the user elects to send one of the packages along the network. Within the e-mail application, the user can select a package and elect to "close the package." According to the first embodiment, the e-mail attachment configurator module 33 of FIG. 3 checks if the compressibility of each file type is above a certain threshold, and then selectively compresses those files. According to the second embodiment, the configurator compresses the optimal number of attachment files in the package in order to reduce the size of the package below the e-mail size limit determined by the LAN(s).

As can be readily seen, the e-mail configuration module and the system and method for compressing attachments to electronic mail communications for transmission provides several advantages to the sender for composing and transmitting e-mail communications. The system allows for the most efficient use of the sender's network by compressing files during periods of high network traffic. The system also saves time for both the sender and the recipient of the e-mail communication, by compressing files to allow the e-mail communication to be transmitted as a single e-mail, and only compressing those files necessary to comply with the size or compressibility thresholds determined by the network. Additionally, the e-mail configuration module can be incorporated into a system and for configuring packages of attachments in e-mail communications. Once the package is defined, the e-mail configuration module compresses attachment files in the package such that the entire package can be sent as a single e-mail communication.

In addition, according to exemplary embodiments, a method, system, and machine-readable medium are provided for selectively compressing attachment files in an electronic communication, such as an e-mail communication, to facilitate the transmission of electronic communications, where the files authorized by a user are compressed as required for transmission. Further, for some embodiments, if a file is a compressible type, then the user is prompted to determine whether the file should be compressed. Also, in some embodiments, if the file is larger than a threshold value, the user is prompted to choose whether to compress the file or not. Accordingly, the selective compression of attachment files maximizes the speed and efficiency of electronic communications. The attachment files can be compressed by any of several known compression applications, using known algorithms, including PKZIP®, WinRar®, Jpeg, etc. The system can also use different compression applications according to the type of file to be compressed.

One embodiment, among others, of a system for compressing attachment files in electronic communications is now explained with reference to the e-mail communications system 1130 in FIG. 11. E-mail interface 1131 provides a user interface for composing e-mail communications. Files that are selected to be attachments are stored in memory 1135*a*, and are linked to the e-mail interface through data structures stored in 1135*b*. Compressibility table 1134 provides a database of a plurality of different types of files and the corresponding type of compression that would be utilized to compress a particular file type. Different types of file compressions are more effective for certain types of file types. Examples of file types might include word processing files, CAD files, video files, presentation software application files, picture files, etc. FIG. 12 shows one example of a compressibility table 1134 that may be employed in the e-mail communications system 1130. In the example shown, a bitmap image file having a filename with an extension of .BMP can be compressed using JPEG compression and converted to a file having a filename with an extension of .JPG; a Microsoft PowerPoint® file having a filename with an extension of .PPT or a document file having a filename with an extension of .DOC can be compressed or "zipped" to form a file having a respective filename with an extension of ZIP; and a Rich Text Formatted file having a filename with an extension of .RTF can be converted to a text file having a filename with an extension of .TXT.

Referring back to FIG. 11, the compressibility table 1134 is connected to an e-mail attachment configurator module 1133 for determining which of the attachment files are to be compressed. Compression module 1136 performs the compression of the attachment files selected to be compressed. The compressed files are stored in memory 1135*b*. Once the e-mail communication is configured for transmission, e-mail interface 1131 forwards the e-mail message and attachment files to network interface 1132.

Figure 13:
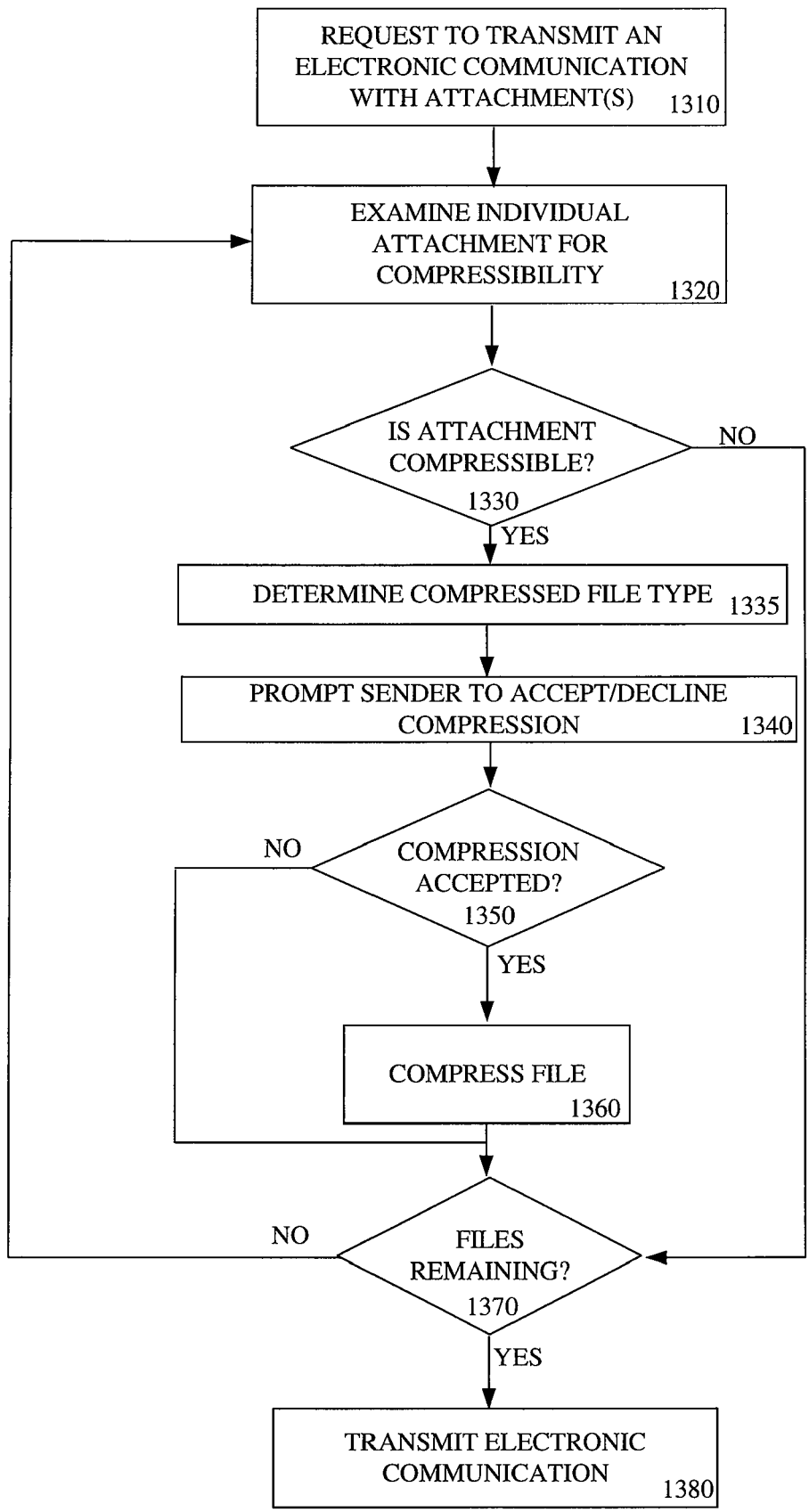
FIG. 13 is a flowchart describing the functionality of one embodiment, among others, of the system of FIG. 1.

One embodiment, among others, of a method of selectively compressing attachment files is now described with reference to FIG. 13. Initially, a user composes an electronic communication (such as an e-mail message, an instant message, etc.) having one or more attachments. Once the user requests to transmit (via a send operation, for example) the electronic communication, the system receives (1310) the electronic communication, including at least one attachment, ready for transmission to a recipient. This electronic communication is examined (1320) for compressibility by comparing the file types of the attachments against a listing of compressible file types (as shown in FIG. 12 for one example embodiment). If the file type of the attachment is a compressible file type (such as a .BMP file), then the compressed file type is determined (such as .JPG file) (1330-1335). Information regarding the compressibility of one of the designated attachment files may be loaded into the e-mail attachment configurator module 1133 of FIG. 11.

If an attachment is a compressible file type, the sender of the communication is presented with a prompt offering to compress the attachment, as shown in step 1340. Optionally, this step might include an indication to the sender of additional information that may assist him or her in deciding whether to accept or decline the compression offer. This information may include comparisons of characteristics of the original attachment file as compared against the proposed compressed version. Examples of these characteristics may include estimated file size; estimated time to download the message at the recipient's end of the communication, assuming various connection speeds for the recipient; and estimated content degradation characteristics (if any, for example, a quantification such as pixels per inch comparison original vs. compressed image files). If compression is accepted (1350) by the sender, a compression module then executes (1360) the associated compression algorithm on the original attachment to convert it to a compressed file in preparation for transmission. The process of examining attachment files for compressibility and offering the sender to compress compatible files continues until each file has been analyzed. When the system determines that no other files remain to be analyzed (1370), the electronic communication is transmitted, as indicated in step 1380.

Figure 14:
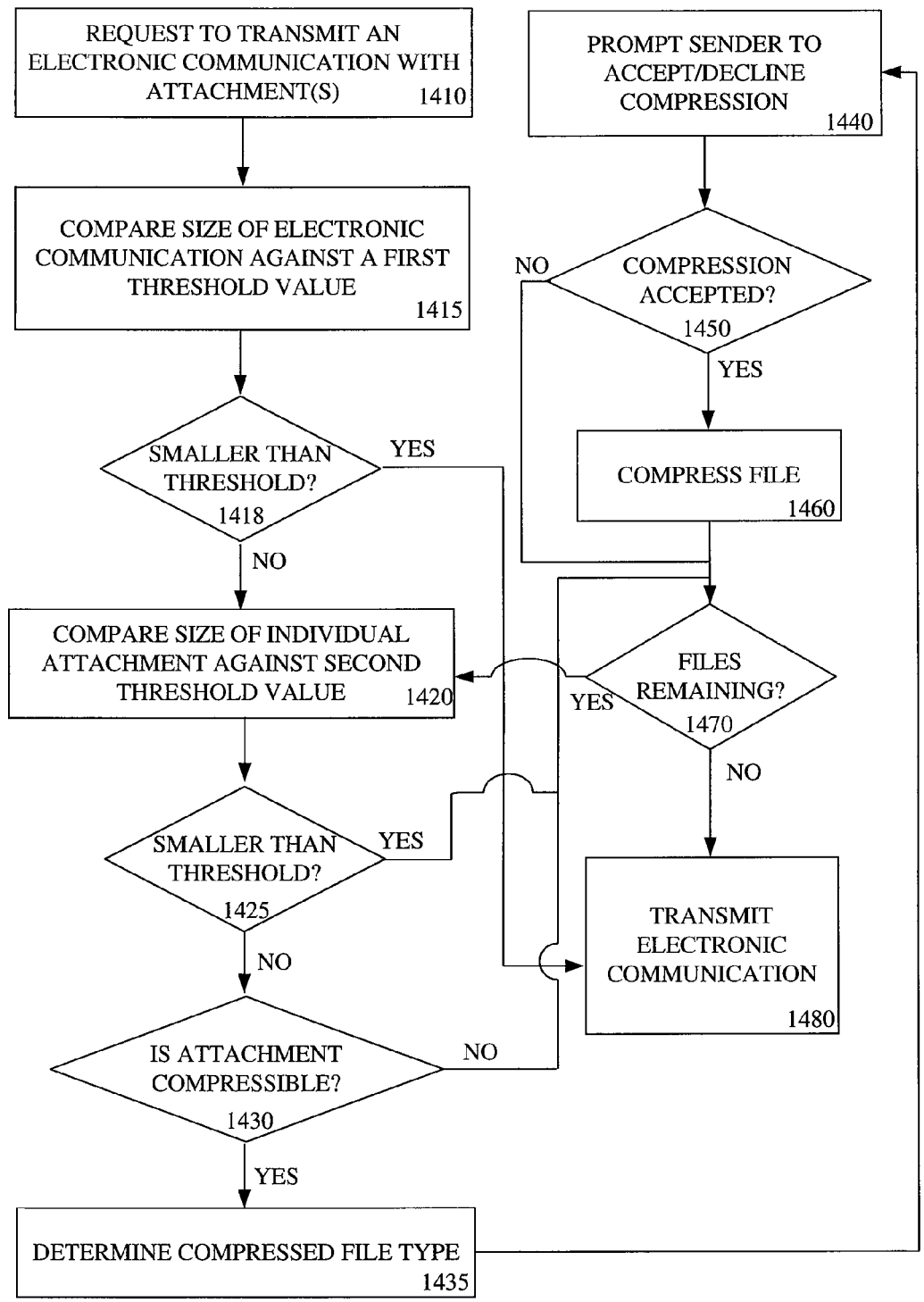
FIG. 14 is a flowchart describing the functionality of one embodiment, among others, of the system of FIG. 1.

Next, FIG. 14 shows another embodiment, among others, of a method of selectively compressing attachment files. Typically, a user composes an electronic communication (such as an e-mail message, an instant message, etc.) having one or more attachments. Once the user requests to transmit (via a send operation, for example) the electronic communication (1410), the system receives the electronic communication, including at least one attachment, ready for transmission to a recipient. This electronic communication is examined (1415) for compressibility by comparing the size of the electronic communication including attachments with a first threshold value specified in bytes. If the electronic communication is smaller (1418) than the first threshold value, the electronic communication is transmitted without further examination of the attachment(s), as shown in step 1480. Alternatively, the electronic communication proceeds to step 1420.

In step 1420, the size of an individual attachment is examined to determine if the attachment size is smaller than a second threshold value. If the size of the individual attachment is smaller (1425) than the second threshold value, the individual attachment will be transmitted in its current format and the process proceeds to examine any remaining attachments, as shown in step 1470. However, if the size of the individual attachment is larger than the second threshold value, the examination of the attachment proceeds to step 1430.

In step 1430, the individual attachment is checked or examined for compressibility by comparing the file types of the attachment against a listing of compressible file types (as shown in FIG. 12 for one example embodiment). If the file type of the attachment is a compressible file type, then the compressed file type is determined (1430-1435) for the attachment. If an attachment is a compressible file type, the sender of the communication is presented with a prompt offering to compress the attachment, as shown in step 1440. Optionally, this step might include an indication to the sender of additional information that may assist the sender in deciding whether to accept or decline the compression offer, as previously discussed. If compression is accepted (1450) by the sender, a compression module then executes (1460) the associated compression algorithm on the original attachment to convert it to a compressed file in preparation for transmission. The process of examining attachment files for compressibility and offering the sender to compress compressible files continues until each file has been analyzed. When the system determines that no other files remain to be analyzed (1470), the electronic communication is transmitted, as indicated in step 1480.

Threshold values according to which the system 1130, for some embodiments, decides whether to provide a user an offer to compress an attachment file can be automatically calculated, predetermined, or user-selected. An automatically calculated system changes the threshold point or value according to the relative amount of traffic on the network. For example, in the late evening, when a LAN for a business is generally underutilized, a threshold for compressing files can be set to be relatively large such that few files result in offers for compression. This allows for faster transmission because the system 1130 examines compressibility and also compresses comparatively fewer files before transmission. The recipient of the electronic communication will also have the benefit that fewer files need to be decompressed. In contrast, during the peak hours on the network, the compression threshold is lowered, such that more of the attachment files are eligible for compression before transmission along the network. This potentially reduces the number of packets sent along the network during busy time periods, thus allowing for more efficient usage.

Figure 11:
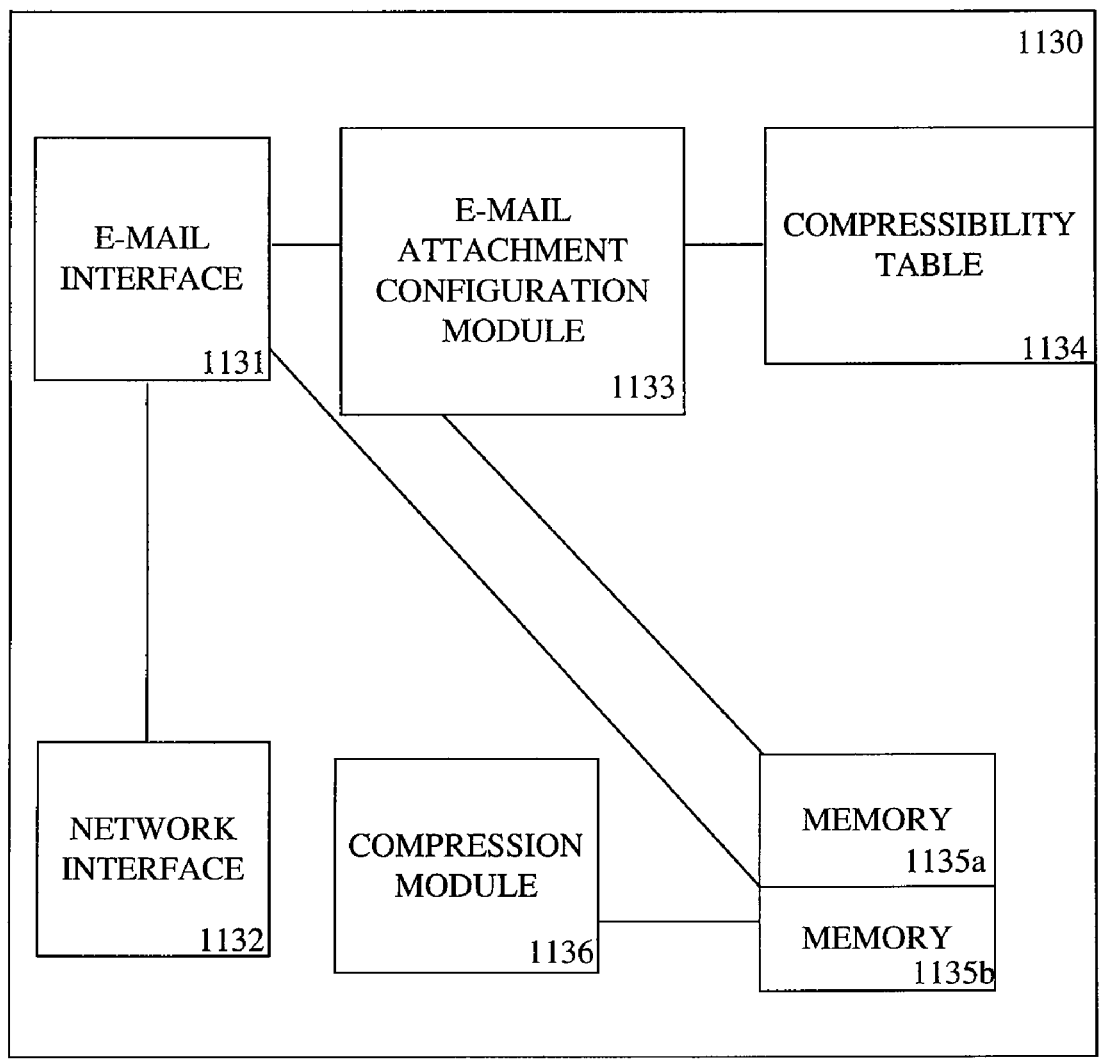
FIG. 11 is a schematic diagram of one embodiment, among others, of an e-mail communication system for compressing attachment files in accordance with FIG. 1.

For example, for the system shown in FIG. 11, a detector connected to the network server (not shown) detects the relative network traffic, and sends a signal regarding the traffic information to network interface 1132. The detector determines the relative amount of traffic on the network by a number of known methods. This information is then provided to the e-mail attachment configuration module 1133 from network interface 1132.

A predetermined system can be configured to compress those files that are capable of noticeable compression. It can additionally include time-of-day features, in which a compression threshold, such as those used in steps 1415-1418 and/or steps 1420-1425 of FIG. 14, varies according to the time. For example, it is commonly known that a LAN for a typical business is busiest during the mid-morning, the time period immediately after lunch, and the time period immediately before 5:00 p.m. A particular compression threshold can be adjusted to accommodate for higher network traffic during the peak times. During peak times, the particular compression threshold is then lowered, such that most files that are capable of noticeable compression will be eligible to be compressed, at the user's choosing. In this manner, users are encouraged to transmit compressed files in an e-mail communication during peak hours.

Alternatively, a user can select a compression threshold, as used in steps 1420-1425 of FIG. 14, based upon the user's knowledge of the number of files that are to be attached, or the relative priority of the message. As an example of a user-selected compression threshold, an e-mail application, for example, may be configured to provide a "compressibility selector" with a "high, medium, or low" selection. Continuing further, the "medium" selection, for example, could be programmed to prompt compression of all file types that can be compressed by 15% or more. If the files that are to be attached are able to be effectively or significantly compressed, the user will likely opt to choose the option of compressing the files, and therefore, is provided a prompt for making that choice. However, if the user is only sending files that would not be effectively compressed, the user is not prompted to compress the attached files.

As can be readily seen, embodiments of systems and methods for compressing attachments to electronic communications for transmission provides several advantages to the sender for composing and transmitting electronic communications. The system saves time for both the sender and the recipient of the electronic communication, by prompting and compressing files that are individually targeted by the sender and only prompting compressing of files necessary to comply with the size or compressibility thresholds determined by the network or the sender.

Figure 15:
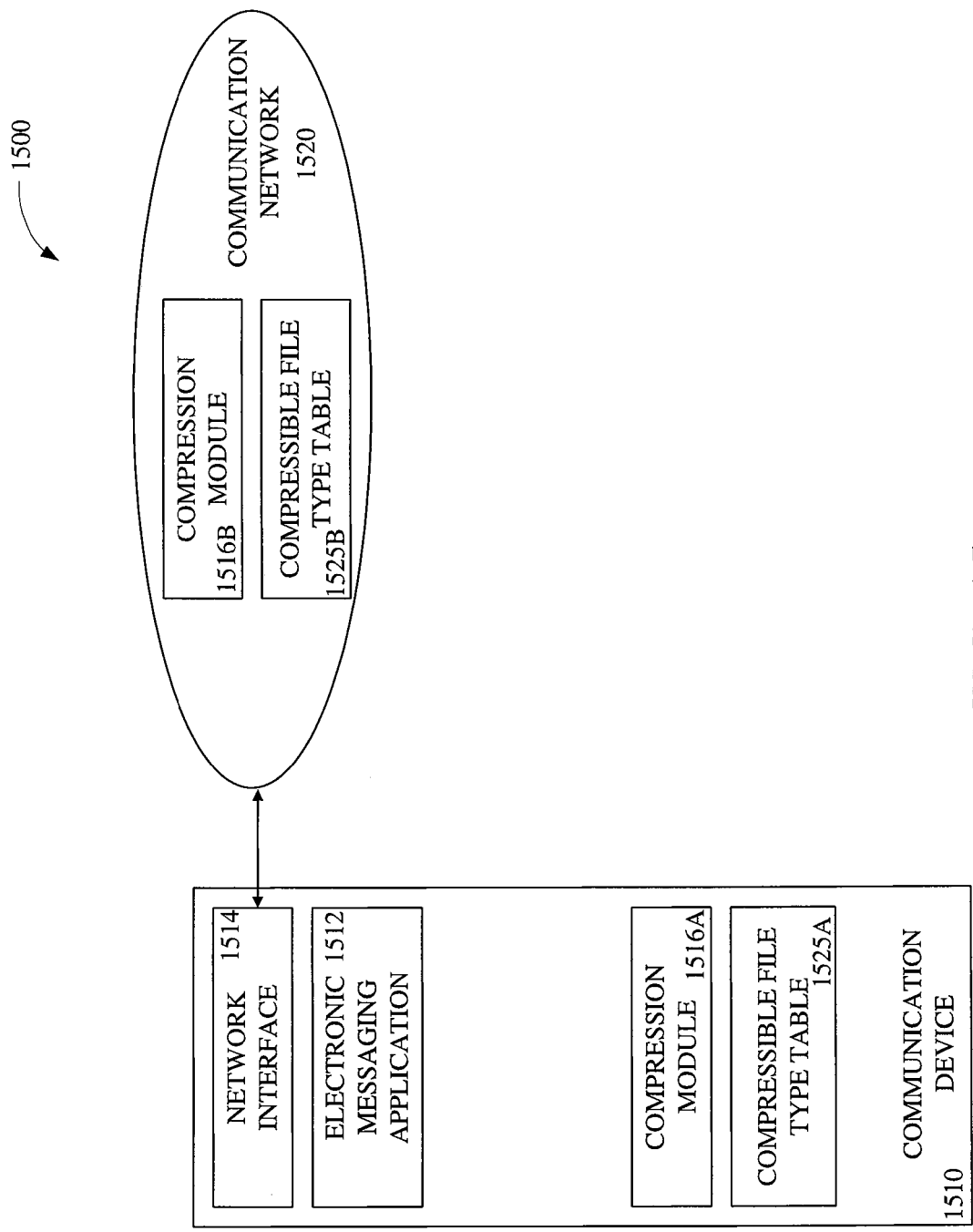
FIG. 15 is a schematic diagram of one embodiment, among others, of a system for compressing attachments in electronic communications in accordance with FIG. 1.

Next, FIG. 15 shows an exemplary embodiment, among others, of a system 1500 for compressing attachments in electronic communications. The system 1500 may include a sender's communication device 1510, which may be any wireline or wireless device capable of sending and receiving electronic communications. The device 1510 is in communication with a communication network 1520, which may be a wireline or wireless network. The device 1510 contains an electronic messaging application 1512 that sends and receives electronic communications to the communication network 1520 by way of a network interface 1514. The system 1500 further contains a compression module 1516A, 1516B, which may exist either within the communication device (as shown by module 1516A) or within the communication network (as shown by module 1516B), for compression of original attachment files into compressed attachment files. The system 1500 further contains a compressible file type table 1525A, 1525B or other equivalent listing of types of files that can be compressed by the system 1500 in preparation for transmission. Compressible file type table 1525A, 1525B or equivalent also contains a listing of compressed file type for each compressible type of file. This table 1525A, 1525B or equivalent may exist either within the communication device 1510 (as shown by table 1525A) or within the communications network 1520 (as shown by table 1525B).

Various embodiments of the present disclosure can be implemented in hardware, software, firmware, or a combination thereof. In some embodiments, for example, steps of a particular method are implemented in hardware, with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. If implemented in software or firmware, as in an alternative embodiment, method steps are stored in a memory that is executed by a suitable instruction execution system. Such software programs can also be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of the some embodiments of the present disclosure in logic embodied in hardware or software-configured mediums.

It should be emphasized that the above-described embodiments of the present disclosure, particularly, any "preferred" or "exemplary" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

Therefore, having thus described embodiments of the invention, at least the following is claimed:

1. A method for compressing data in a communication transmitted in an electronic messaging system, comprising:
   as part of a process of carrying out a request to transmit an electronic messaging communication, providing a prompt offering to compress content of the electronic messaging communication if the content of the electronic messaging communication is determined to be suitable for compressing, the determination being based on a type of content and whether a size of the content is larger than a threshold value;
   compressing the content if a composer accepts the offer to compress the content of the electronic messaging communication; and
   transmitting the electronic messaging communication, wherein the prompt provides additional information to assist the composer in deciding whether to accept or decline the offer to compress the content of the electronic messaging communication, the additional information comprising a comparison of characteristics of an original attachment file against a proposed compressed version of the original attachment file.

2. The method according to claim 1, further comprising:
   comparing file types of attachments within the electronic messaging communication with a listing of compressible file types.

3. The method according to claim 1, wherein compressing the content of the electronic messaging communication comprises compressing the original attachment file from a first file type into a compressed attachment file of a second file type.

4. The method according to claim 3, further comprising creating a communication that replaces the original attachment file with the compressed attachment file for transmission to a recipient.

5. The method according to claim 1, wherein the electronic messaging communication is at least one of an e-mail and an instant message.

6. The method according to claim 1, wherein a transmitted electronic messaging communication contains an indication to a recipient that attachment files are compressed from their original content.

7. The method according to claim 1, wherein the characteristics comprise an estimated file size of the compressed version.

8. The method according to claim 1, wherein the characteristics comprise an estimated time to download the electronic messaging communication by a recipient of the electronic messaging communication.

9. The method according to claim 1, wherein the characteristics comprise estimated degradation characteristics of the compressed version.

10. The method according to claim 1, further comprising:
    after transmission of the electronic messaging communication, receiving a notification that the electronic messaging communication was undeliverable due to a size of the electronic messaging communication, the notification containing an acceptable size limit for the electronic messaging communication; and
    providing a prompt offering to compress the electronic messaging communication below the acceptable size limit and re-transmit the electronic messaging communication.

11. A non-transitory machine-readable storage medium, having stored thereon data and instructions tangibly embodied in the storage medium so as to be executable by a processor and when executed, cause the processor to perform:
    as part of a process of carrying out a request to transmit an electronic messaging communication, providing a prompt offering to compress content of the electronic messaging communication if the content of the electronic messaging communication is determined to be suitable for compressing, the determination being based on the type of content and whether a size of the content is larger than a threshold value;
    compressing the content if a composer accepts the offer to compress the content of the electronic messaging communication; and
    transmitting the electronic messaging communication, wherein the prompt provides additional information to assist the composer in deciding whether to accept or decline the offer to compress the content of the electronic messaging communication, the additional information comprising a comparison of characteristics of an original attachment file against a proposed compressed version of the original attachment file.

12. The non-transitory machine-readable storage medium according to claim 11, further comprising:
comparing file types of attachments within the electronic messaging communication with a listing of compressible file types.

13. The non-transitory machine-readable storage medium according to claim 11, wherein compressing the content of the electronic messaging communication comprises compressing the original attachment file from a first file type into a compressed attachment file of a second file type.

14. The non-transitory machine-readable storage medium according to claim 13, further comprising instructions for creating a communication that replaces the original attachment file with the compressed attachment file for transmission to the recipient.

15. The non-transitory machine-readable storage medium according to claim 11, wherein the electronic messaging communication is at least one of an e-mail and an instant message.

16. The non-transitory machine-readable storage medium according to claim 11, wherein the characteristics comprise an estimated file size of the compressed version.

17. The non-transitory machine-readable storage medium according to claim 16, wherein the characteristics comprise an estimated time to download the electronic messaging communication by a recipient of the electronic messaging communication.

18. The non-transitory machine-readable storage medium according to claim 16, wherein the characteristics comprise estimated degradation characteristics of the compressed version.

* * * * *